United States Patent
Janakiraman et al.

(10) Patent No.: US 11,256,316 B2
(45) Date of Patent: Feb. 22, 2022

(54) AUTOMATED DEVICE POWER CONSERVATION USING MACHINE LEARNING TECHNIQUES

(71) Applicant: Dell Products L.P., Round Rock, TX (US)

(72) Inventors: Tamilarasan Janakiraman, Tamilnadu (IN); Sreeram Muthuraman, Kerala (IN); Balamurugan Gnanasambandam, Pondicherry (IN); Charu Lata Ojha, Karnataka (IN); Santosh Kumar Sahu, Gondala (IN); Vaishnavi Suchindran, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 7 days.

(21) Appl. No.: 16/802,840

(22) Filed: Feb. 27, 2020

(65) Prior Publication Data
US 2021/0271310 A1 Sep. 2, 2021

(51) Int. Cl.
*G06F 1/32* (2019.01)
*G06F 1/3246* (2019.01)
*G06N 20/00* (2019.01)
*G06F 1/3203* (2019.01)

(52) U.S. Cl.
CPC .......... *G06F 1/3246* (2013.01); *G06N 20/00* (2019.01); *G06F 1/3203* (2013.01)

(58) Field of Classification Search
CPC .............................. G06F 1/3246; G06N 20/00
USPC ....................................................... 713/320
See application file for complete search history.

(56) References Cited

U.S. PATENT DOCUMENTS

| | | | |
|---|---|---|---|
| 8,543,851 B2 | 9/2013 | Srebranig et al. | |
| 9,177,323 B2 | 11/2015 | Forbes, Jr. | |
| 2011/0183726 A1 | 7/2011 | Deng | |
| 2012/0066526 A1* | 3/2012 | Salsbery | G06F 1/3203 713/320 |
| 2012/0173888 A1* | 7/2012 | Srebranig | G06F 1/3287 713/300 |
| 2012/0221163 A1* | 8/2012 | Forbes, Jr. | H02J 3/00 700/295 |
| 2013/0262891 A1* | 10/2013 | Gudlavenkatasiva | G06F 1/3212 713/320 |
| 2014/0032449 A1* | 1/2014 | Kacin | H04L 41/0883 706/12 |
| 2018/0176860 A1* | 6/2018 | Triano | H04W 4/029 |
| 2018/0321949 A1* | 11/2018 | Bikumala | G06F 3/04886 |
| 2019/0101968 A1* | 4/2019 | Song | G06F 1/28 |

(Continued)

*Primary Examiner* — Volvick Derose
(74) *Attorney, Agent, or Firm* — Ryan, Mason & Lewis, LLP (57) ABSTRACT

Methods, apparatus, and processor-readable storage media for automated device power conservation using machine learning techniques are provided herein. An example computer-implemented method includes obtaining usage-related data from one or more processing devices; determining at least one usage pattern for the one or more processing devices by processing the obtained usage-related data using one or more machine learning techniques; automatically generating, based at least in part on the at least one determined usage pattern, instructions pertaining to controlling one or more power states of the one or more processing devices; and performing at least one automated action based at least in part on the generated instructions.

20 Claims, 7 Drawing Sheets

(56) References Cited

U.S. PATENT DOCUMENTS

2020/0278738 A1* 9/2020 Madar, III ............ G06F 1/3206
2021/0153124 A1* 5/2021 Pandey ............... H04W 52/027
2021/0166499 A1* 6/2021 Vaid ....................... G07C 5/006

* cited by examiner

In [ ]:
```
import pandas as pd
from matplotlib import pyplot
from pandas.plotting import autocorrelation_plot
from pandas import read_csv
from pandas import datetime
from pandas import DataFrame
from statsmodels.tsa.arima_model import ARIMA
from sklearn.metrics import mean_squared_error def parser(x):
    return pd. datetime.strptime('190'+x, '%Y-%m')
```

FIG. 2B
/— 201

In [89]:
```
col_Names=["Time", "Percent"]
ser = pd.read_csv('power_data.csv', names=col_Names)
```

FIG. 2C
/— 202

In [90]:
```
print(ser.head())
df1 = pd.DataFrame(data=ser)
```

|   | Time | Percent |
|---|------|---------|
| 0 | 2019-11-15 14:38:07 | 22 |
| 1 | 2019-11-15 14:38:13 | 22 |
| 2 | 2019-11-15 14:38:18 | 22 |
| 3 | 2019-11-15 14:38:24 | 22 |
| 4 | 2019-11-15 14:38:29 | 22 |

FIG. 2D
/— 203

In [91]: `df1['Time'].dtype`

Out [91]: dtype('O')

FIG. 2E
204

In [92]: `#df1['Time1'] = pd.to_datetime(ser['Time'], format='%m%d%Y %H:%M:%S', errors='coerce')`
`#df1['Time1'] = pd.to_datetime(ser['Time'], format='%Y-%m-%d %H:%M', errors='coerce')`

In [93]: `#df1.info()`

```
<class 'pandas.core.frame.DataFrame'>
RangeIndex: 799 entries, 0 to 798
Data columns (total 2 columns):
Time       799 non-null datetime64[ns]
Percent    799 non-null int64
dtypes: datetime64[ns](1), int64(1)
memory usage: 12.6 KB
```

In [94]: `#df1['Time']=df1['Time'].dt.strftime('%H:%M:%S')`

In [95]: `#df1['Percent']=ser['Percent']`

In [96]: `#df1['Time'].head()`
`df1.head()`

Out [96]:
```
       Time              Percent
0  2019-11-15 14:38:07     22
1  2019-11-15 14:38:13     22
2  2019-11-15 14:38:18     22
3  2019-11-15 14:38:24     22
4  2019-11-15 14:38:29     22
```

In [98]: `#series=df1`

In [99]: `ser.head()`
`ser.dtypes`

Out [99]:
```
Time       datetime64[ns]
Percent              int64
dtype: object
```

*FIG. 2F*

In [100]:
```
print(ser.head())
#ser.plot()
pyplot.show()

ser = pd.read_cvs('power_data.cvs', header=0, parse_dates=[0], index_col=0, squeeze=True)
#autocorrelation_plot(df1)
#pyplot.show()

# fit model
model = ARIMA(ser, order=(5,1,0))
model_fit = model.fit(disp=0)
print(model_fit.summary())
# plot residual errors
residuals = DataFrame(model_fit.resid)
residuals.plot()
pyplot.show()
residuals.plot(kind='kde')
pyplot.show()
print(residuals.describe())

#Divide into training and test. Predict the trend
X = ser.values
size = int(len(X) * 0.66)
train, test = X[0:size], X[size:len(X)]
history = [x for x in train]
predictions = list()
```

FIG. 2G

In [101]:
```
for t in range(len(test)):
        model = ARIMA(history, order=(5,1,0))
        model_fit = model_fit(disp=0)
        output = model_fit.forecast()
        yhat = output[0]
        predictions.append(yhat)
        obs = test[t]
        history.append(obs)
        print('predicted=%f, expected=%f' % (yhat, obs))
error = mean_squared_error(test, predictions)
#print('Mean Squared Error: %.3f' % error)
# plot
pyplot.plot(test)
pyplot.plot(predicitons, color='red')
pyplot.show()
```

FIG. 2H

In [102]:
```
error = mean_squared_error(test, predictions)
print('Test Mean Squared Error: %.3f' % error)
# plot
accuracy =model_accurate(error)
print('Model accuracy is: %.3f' % accuracy)
pyplot.plot(test)
pyplot.plot(predictions, color='red')
pyplot.show()
```

AUTOMATED DEVICE POWER CONSERVATION USING MACHINE LEARNING TECHNIQUES

FIELD

The field relates generally to information processing systems, and more particularly to techniques for power management in such systems.

BACKGROUND

Devices that are only used during discrete periods of time are commonly kept in powered-on states during other periods of time. Additionally, certain devices consume similar amounts of power in a powered-on state regardless of whether the device is in use or not in use. However, conventional power management approaches fail to determine and leverage device-specific usage patterns, thereby creating accuracy problems and leading to premature power conservation actions or avoidable device power failures.

SUMMARY

Illustrative embodiments of the disclosure provide automated device power conservation using machine learning techniques. An exemplary computer-implemented method includes obtaining usage-related data from one or more processing devices, and determining at least one usage pattern for the one or more processing devices by processing the obtained usage-related data using one or more machine learning techniques. The method also includes automatically generating, based at least in part on the at least one determined usage pattern, instructions pertaining to controlling one or more power states of the one or more processing devices, and performing at least one automated action based at least in part on the generated instructions.

Illustrative embodiments can provide significant advantages relative to conventional power management approaches. For example, problems associated with device usage determination inaccuracies are overcome in one or more embodiments through processing device usage data using machine learning techniques to control power states of such devices.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
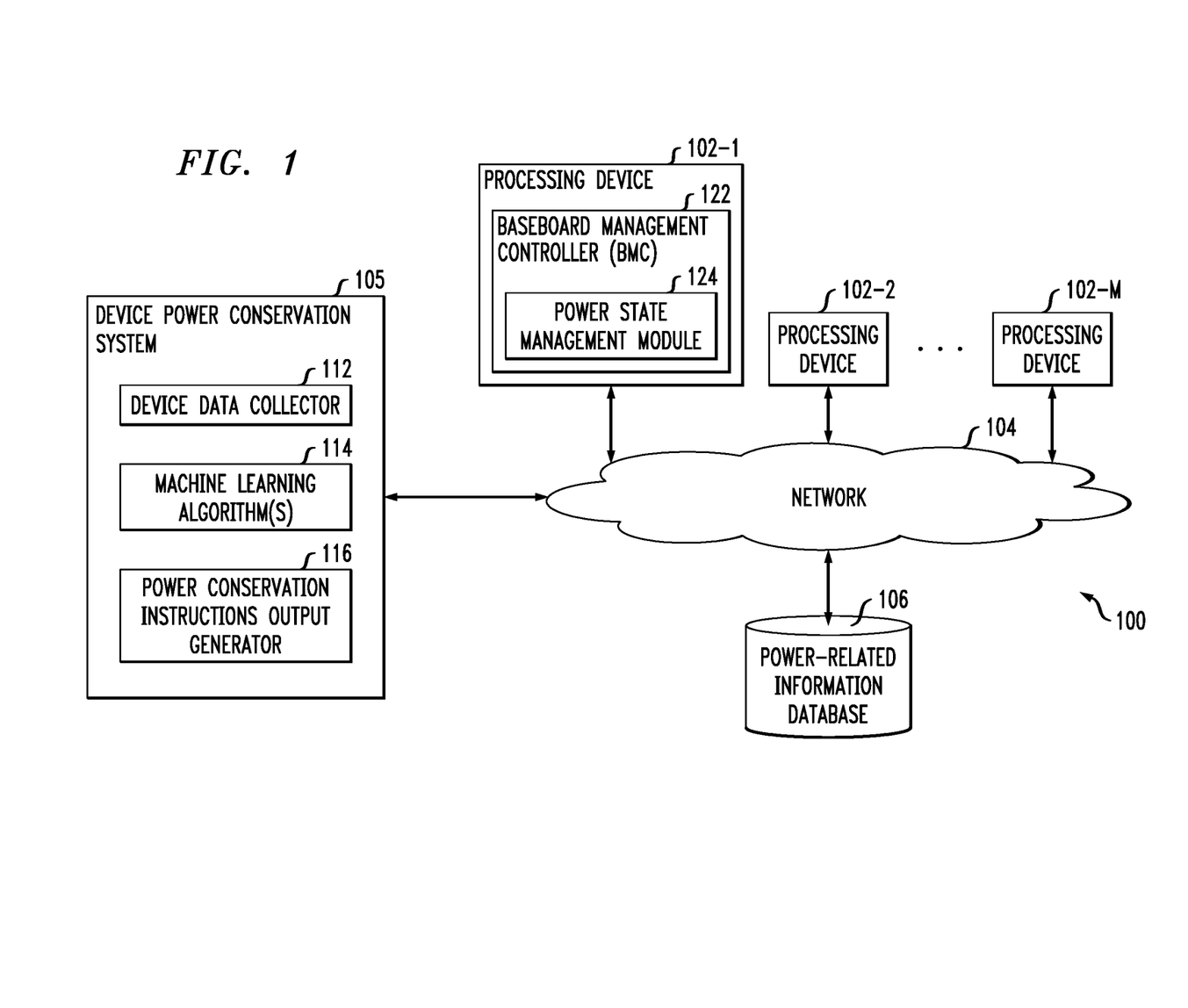
FIG. 1 shows an information processing system configured for automated device power conservation using machine learning techniques in an illustrative embodiment.

FIG. 1 shows a computer network (also referred to herein as an information processing system) 100 configured in accordance with an illustrative embodiment. The computer network 100 comprises a plurality of processing devices 102-1, 102-2, . . . 102-M, collectively referred to herein as processing devices 102. The processing devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is device power conservation system 105.

The processing devices 102 may comprise, for example, mobile telephones, laptop computers, tablet computers, desktop computers or other types of computing devices. Some of these processing devices are also generally referred to herein as "computers." As also depicted in FIG. 1, the processing devices 102 each comprises a baseboard management controller (BMC) 122, which further includes a power state management module 124. The BMC 122 constitutes a processor that monitors the state and/or one or more parameters of the given processing device 102. The power state management module 124 controls and/or influences the power consumption of one or more components of the given processing device 102.

The processing devices 102 in some embodiments comprise respective computers associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the device power conservation system 105 can have an associated database 106 configured to store power-related information which comprises, for example, information pertaining to system infrastructure, intelligent platform management interface (IPMI) compute usage per second (CUPS) sensors on for central processing unit (CPU) utilization, memory CUPS sensors for memory utilization for one or more memory channels, input-output (IO) CUPS for input-output utilization.

The database 106 in the present embodiment is implemented using one or more storage systems associated with the device power conservation system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the device power conservation system 105 are input-output devices (not shown), which illustratively comprise keyboards, displays or other types of input-output devices in any combination. Such input-output devices can be used, for example, to support one or more user interfaces to the device power conservation system 105, as well as to support communication between the device power conservation system 105 and other related systems and devices not explicitly shown.

Also, the device power conservation system 105 in the FIG. 1 embodiment is assumed to be implemented using at least one processing device. Each such processing device generally comprises at least one processor and an associated memory, and implements one or more functional modules for controlling certain features of the device power conservation system 105.

More particularly, the device power conservation system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the device power conservation system 105 to communicate over the network 104 with the processing devices 102, and illustratively comprises one or more conventional transceivers.

The device power conservation system 105 further comprises a device data collector 112, machine learning algorithm(s) 114, and a power conservation instructions output generator 116.

It is to be appreciated that this particular arrangement of modules 112, 114 and 116 illustrated in the device power conservation system 105 of the FIG. 1 embodiment is presented by way of example only, and alternative arrangements can be used in other embodiments. For example, the functionality associated with modules 112, 114 and 116 in other embodiments can be combined into a single module, or separated across a larger number of modules. As another example, multiple distinct processors can be used to implement different ones of the modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for automated device power conservation using machine learning techniques involving processing devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing modules 112, 114 and 116 of an example device power conservation system 105 in computer network 100 will be described in more detail with reference to the flow diagram of FIG. 3.

Accordingly, at least one embodiment includes automated device power conservation using machine learning techniques. For example, such an embodiment can include conserving energy in an environment wherein devices (e.g., servers, workstations, desktops, laptops, etc.) and components associated therewith can accept and/or process power alteration instructions reactively via system management tools. As detailed herein, such an embodiment includes achieving power savings with respect to a device by analyzing one or more patterns of the device and its associated components, and modifying one or more power states (of the device and/or one or more of its components) accordingly without any hardware or infrastructure changes.

One or more embodiments include obtaining and/or collecting data from a processing device and (optionally) providing such data to a database. Such obtained and/or collected data can include, for example, system infrastructure-related data, IPMI CUPS for CPU utilization, memory CUPS for memory utilization for one or more memory channels, IO CUPS for IO utilization, and one or more baseline power values. Also, at least one embodiment includes obtaining such data from a BMC associated with the processing device, and using the data to predict one or more desired power states for the processing device and/or components thereof. Using the processing device's baseline power value in making the power state predictions facilitates the avoidance of a device shutdown while carrying out one or more of the techniques detailed herein.

As also described herein, the processing device being analyzed can include a power state management module that intelligently manages power states to desired values without impacting applications running on the device (which will ensure that the user is agnostic to the state change(s)). Such a module, as illustrated in the example embodiment shown in FIG. 1, runs on the device's corresponding BMC and drives one or more power states of the device and/or components thereof. As noted and as used herein, a (BMC provides intelligence to an IPMI architecture, and can constitute a specialized microcontroller embedded on the motherboard of a processing device. The BMC manages the interface between system-management software and platform hardware. Different types of sensors can report to the BMC with respect to device parameters such as, for example, power status. The BMC monitors the sensors and can send alerts to a user (e.g., system administrator) via a network if any of the parameters do not stay within preset limits, indicating a potential failure of the device.

By way merely of illustration, consider an example use case of a video streaming or gaming server. The general purpose graphics processing unit (GPGPU) on such a server typically consumes 300-400 watts (W) of power when enabled. Based at least in part on analyzed usage pattern data, an example embodiment could include predicting that GPGPU usage occurs only during certain hours of the day. In this scenario, such an example embodiment can include maintaining the server in a given power state (e.g., S0) but enabling the GPGPU only during the determined utilization times. By reactively enabling GPGPU based on usage, such an embodiment includes enabling the conservation of power and, hence, the operating costs associated with the server. It is also to be noted and/or appreciated that such techniques are operating system-independent with respect to driving power states.

As additionally detailed herein, one or more embodiments include implementing one or more machine learning algorithms. Such algorithms, for instance, analyze the duration of a processing device's idle hours by taking the mode value of idle hours. By way of example, in one or more embodiments, such algorithms include at least one autoregressive integrated moving average (ARIMA) model, which is used to predict the most probable sequence of idleness (or activity). In one such embodiment, an ARIMA model can be implemented in connection with ensuring that the idle usage represents the least CPU value in a given set of data.

At least one embodiment can additionally include confirming a determined usage pattern by recalling the usage of the processing device (or the component thereof in question) over a given previous temporal duration (for example, the past week, the past two weeks, the past month, etc.). If the determined usage pattern is confirmed over a given number of previous temporal durations (e.g., for at least three statements), then the usage pattern will be utilized for carrying out at least a portion of the remaining steps of the techniques detailed herein. For example, if the determined usage pattern is confirmed, then an example embodiment can include driving a power state of the given processing device (via the BMC of the device) to a sleep mode state during a related temporal period (associated with idleness).

It is also noted that in one or more embodiments, a usage pattern can be determined and/or selected for one or more patterns or temporal contexts (e.g., hours in a week, a leap month, month dates, etc.) based at least in part on the user's usage of the processing device.

FIG. 2A through FIG. 2H shows example code snippets for machine learning modeling in an illustrative embodiment. In this embodiment, example code snippets 200 through 207 are executed by or under the control of at least one processing system and/or device. For example, one or more of example code snippets 200 through 207 may be viewed as comprising a portion of a software implementation of at least part of device power conservation system 105 of the FIG. 1 embodiment.

Figure 2A:
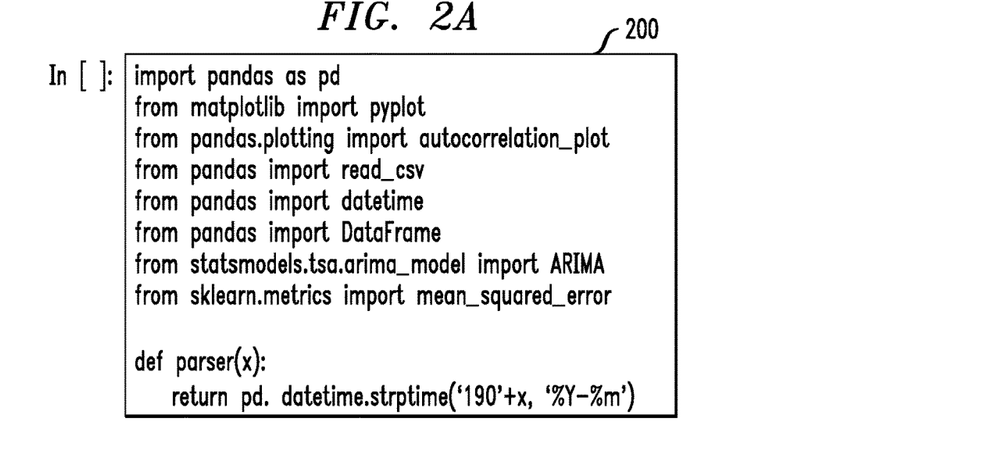
FIG. 2A through FIG. 2H shows example code snippets for machine learning modeling in an illustrative embodiment.
Figure 2B:
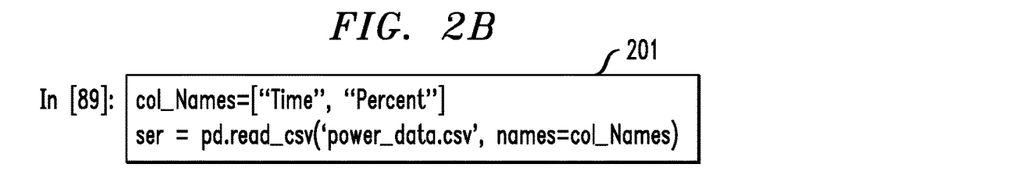
Figure 2C:
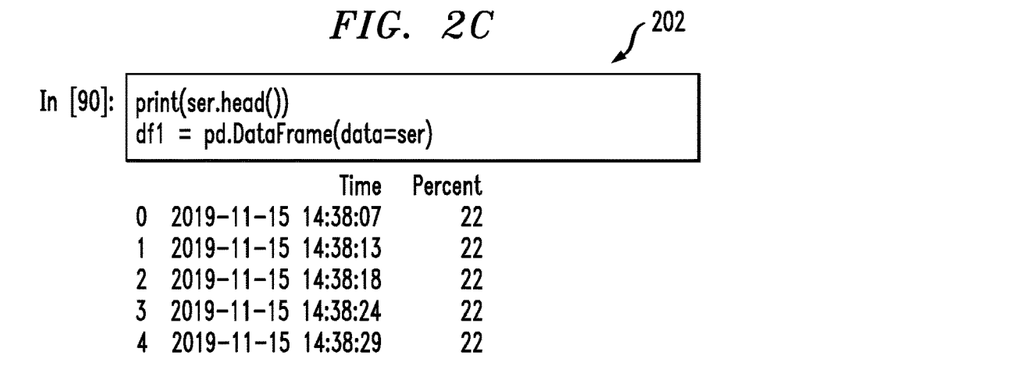
Figure 2D:
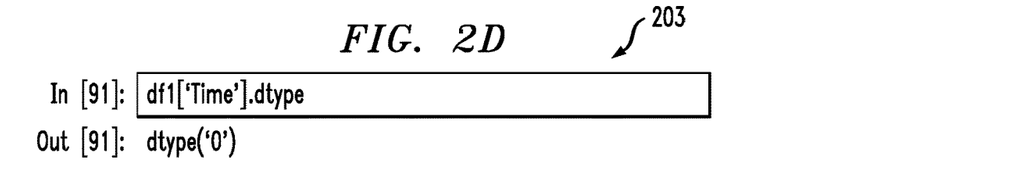
Figure 2E:
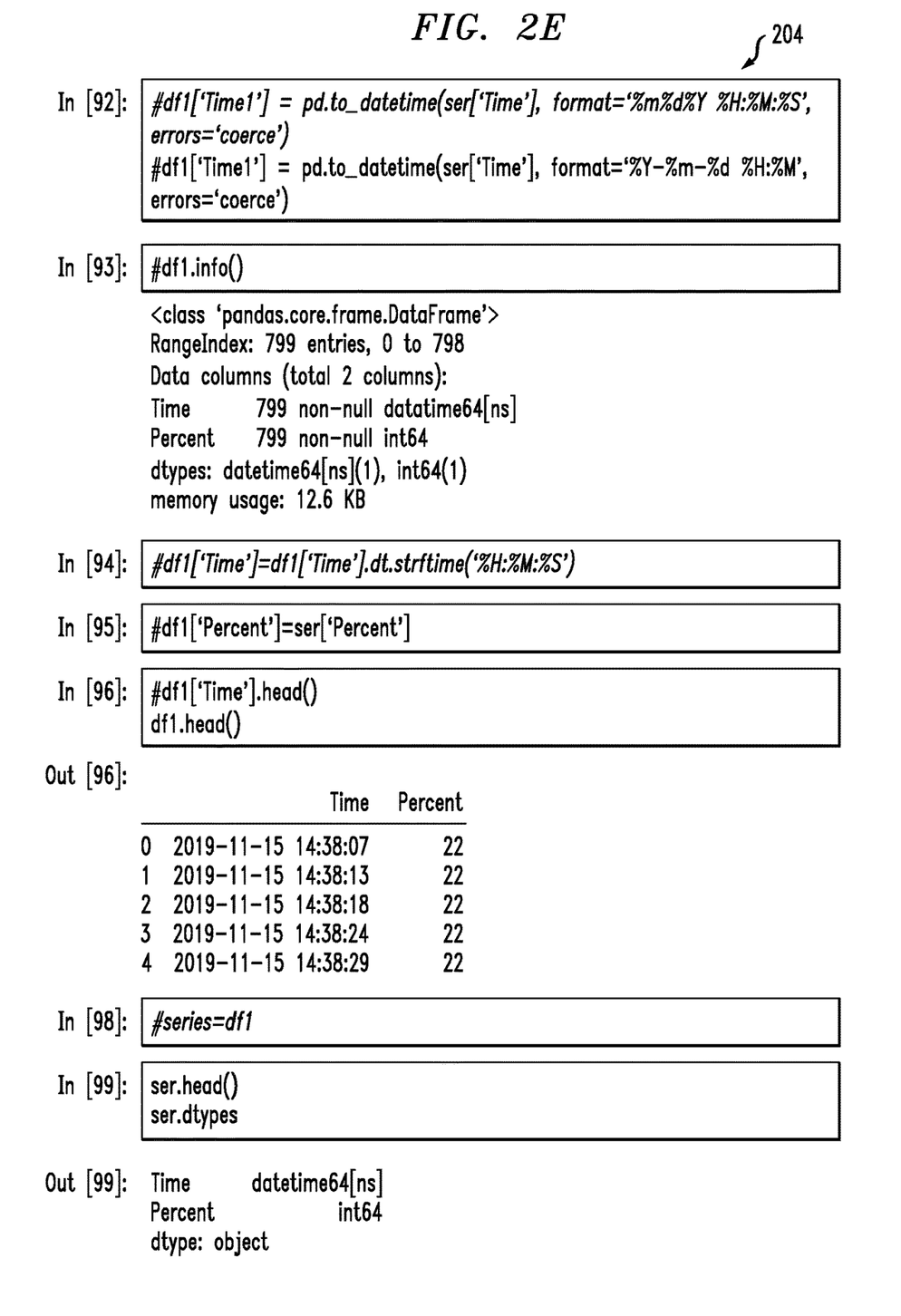

In FIG. 2A, example code snippet 200 details importing multiple modules for machine learning modeling. In FIG. 2B, example code snippet 201 details loading data, in the form of times and percentage values, into a dataframe. Additionally, in FIG. 2C, example code snippet 202 details printing a given set of rows of the dataframe. In FIG. 2D, example code snippet 203 details checking the data type of the "time" variable within the loaded data. Also, in FIG. 2E, example code snippet 204 details converting at least a portion of the "time" variable data to a desired format for future processing.

Figure 2F:
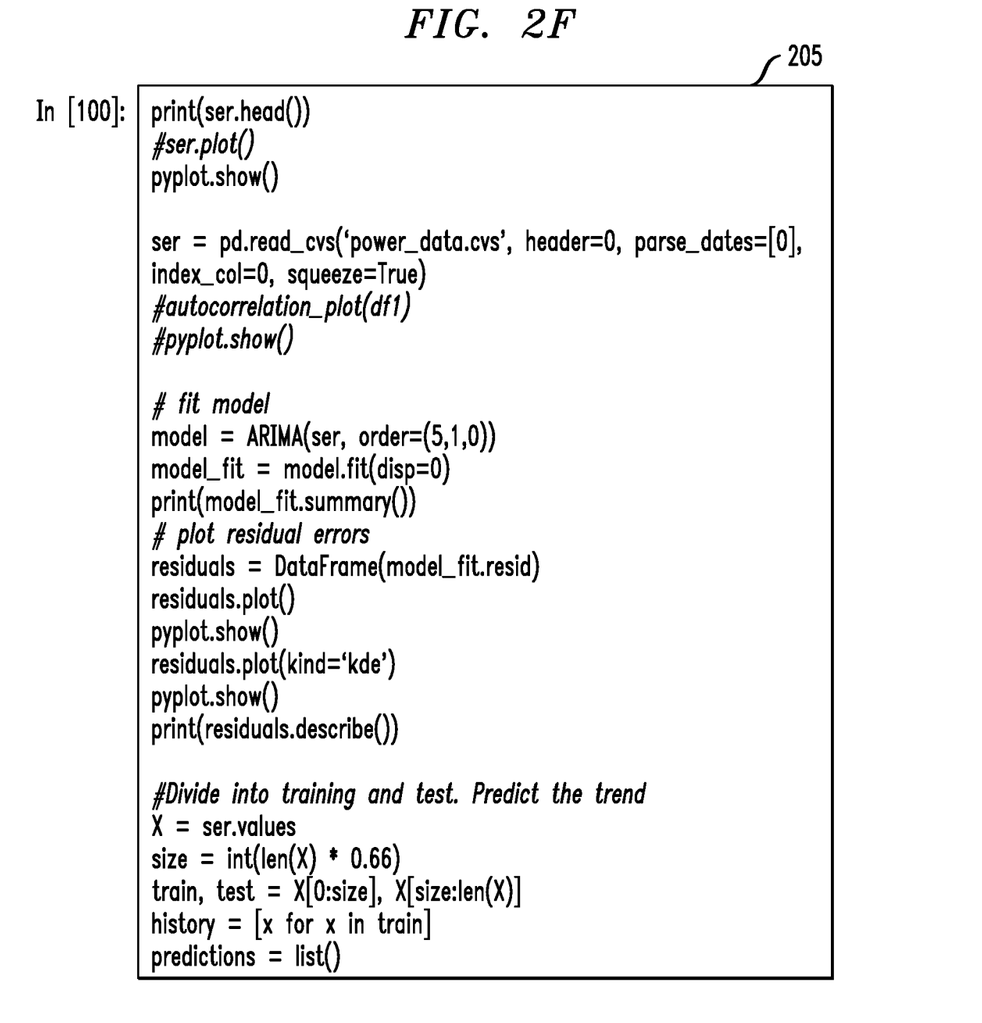
Figure 2G:
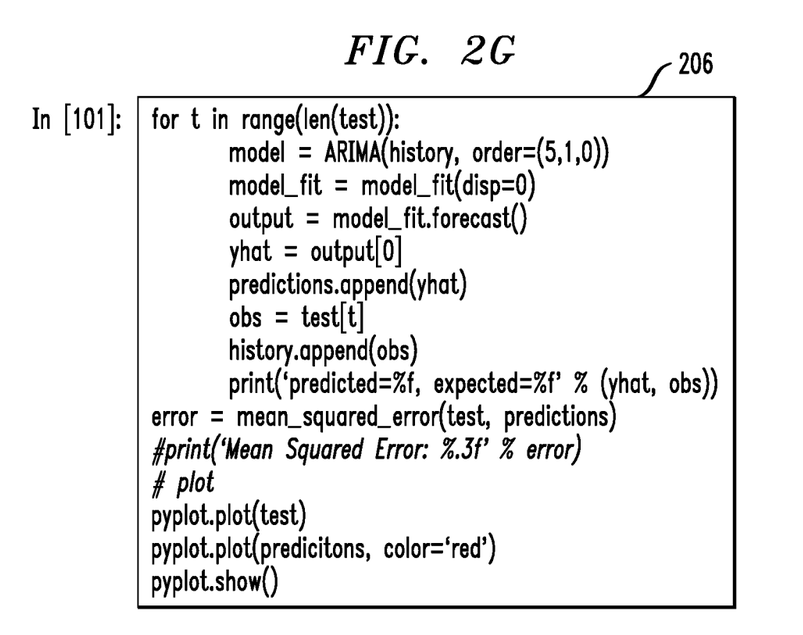
Figure 2H:
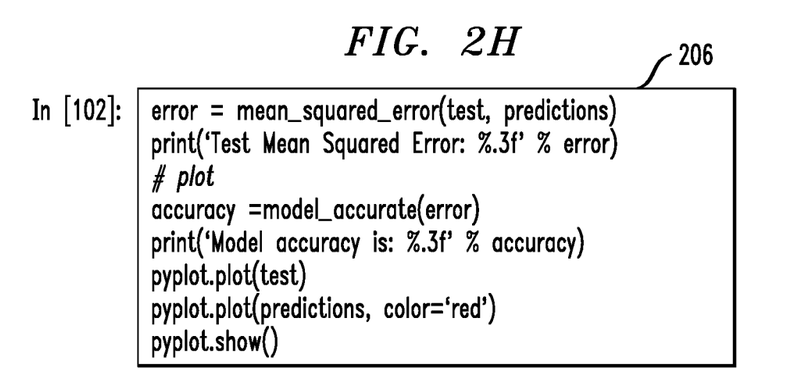

In FIG. 2F, example code snippet 205 details fitting the model with an ARIMA algorithm and dividing the dataset for validating and testing. One or more embodiments can additionally include generating an output that indicates the ARIMA results for the dataset tested. In FIG. 2G, example code snippet 206 details comparing a generated prediction to validation data to determine whether the prediction is similar to real-time data. Further, in FIG. 2H, example code snippet 207 details generating a plot which includes actual and predicted values.

As illustrated in FIG. 2A through FIG. 2H, and as further detailed herein, the variables of time and percentage are fed into the machine learning model implemented in connection with one or more embodiments. One or more preprocessing techniques are carried out on or more inputs to calculate percentage values. Such inputs can include observations that contain metadata that are to be calculated into percentage values. Because one or more embodiments include implementing univariate time series forecasting, all input data in such embodiments is processed into one variable and/or column. In such an embodiment, the machine learning techniques are modeled with at least one ARIMA algorithm.

It is to be appreciated that particular example code snippets depicted in FIG. 2A through FIG. 2H shows just one example of machine learning modeling, and alternative implementations of the process can be used in other embodiments.

Figure 3:
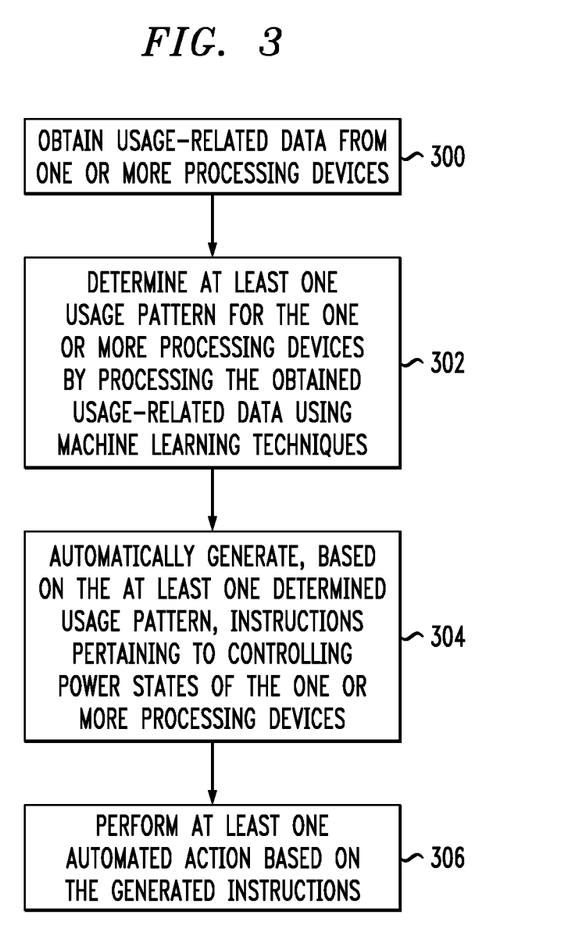
FIG. 3 is a flow diagram of a process for automated device power conservation using machine learning techniques in an illustrative embodiment.

FIG. 3 is a flow diagram of a process for automated device power conservation using machine learning techniques in an illustrative embodiment. It is to be understood that this particular process is only an example, and additional or alternative processes can be carried out in other embodiments.

In this embodiment, the process includes steps 300 through 306. These steps are assumed to be performed by the device power conservation system 105 utilizing its modules 112, 114 and 116.

Step 300 includes obtaining usage-related data from one or more processing devices. Obtaining the usage-related data can include, for example, retrieving the usage-related data from at least one baseboard management controller associated with the one or more processing devices. Also, in at least one embodiment, the usage-related data includes baseline power values for the one or more processing devices and/or information pertaining to one or more of central processing units, memory, system infrastructure utilization, and input-output activity.

Step 302 includes determining at least one usage pattern for the one or more processing devices by processing the obtained usage-related data using one or more machine learning techniques. In at least one embodiment, the usage-related data include time series data, and using the one or more machine learning techniques includes predicting instances of one or more usage states by applying at least one autoregressive integrated moving average model to at least a portion of the time series data. In such an embodiment, the one or more usage states include at least an idle state, and wherein determining the at least one usage pattern comprises determining at least one mode value attributable to at least one instance when the one or more processing devices are in the idle state. Also, in such an embodiment, predicting the instances of one or more usage states includes confirming the at least one determined usage pattern against one or more sets of historical usage-related data from the one or more processing devices.

Additionally or alternatively, determining the at least one usage pattern can include determining at least one usage pattern in accordance with each of one or more temporal parameters. Further, one or more embodiments can include processing the obtained usage-related data using one or more data cleaning techniques.

Step 304 includes automatically generating, based at least in part on the at least one determined usage pattern, instructions pertaining to controlling one or more power states of the one or more processing devices.

Step 306 includes performing at least one automated action based at least in part on the generated instructions. In at least one embodiment, performing the at least one automated action includes automatically transitioning at least a portion of the one or more processing devices to a decreased power mode at one or more instances of time in accordance with the generated instructions. Such an embodiment can include controlling power consumption of individual components (e.g., CPU, memory, IO, GPGPU, etc.) of processing devices independent of each other. Also, in such an embodiment, automatically transitioning the at least a portion of the one or more processing devices to a decreased power mode can include executing at least a portion of the generated instructions via at least one baseboard management controller associated with the one or more processing devices.

Accordingly, the particular processing operations and other functionality described in conjunction with the flow diagram of FIG. 3 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to process device usage data using machine learning techniques to control power states of such devices. These and other embodiments can effectively overcome problems associated with device usage determination inaccuracies.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. Although described in the context of system 100, these platforms may also be used to implement at least portions of other information processing systems in other embodiments.

Figure 4:
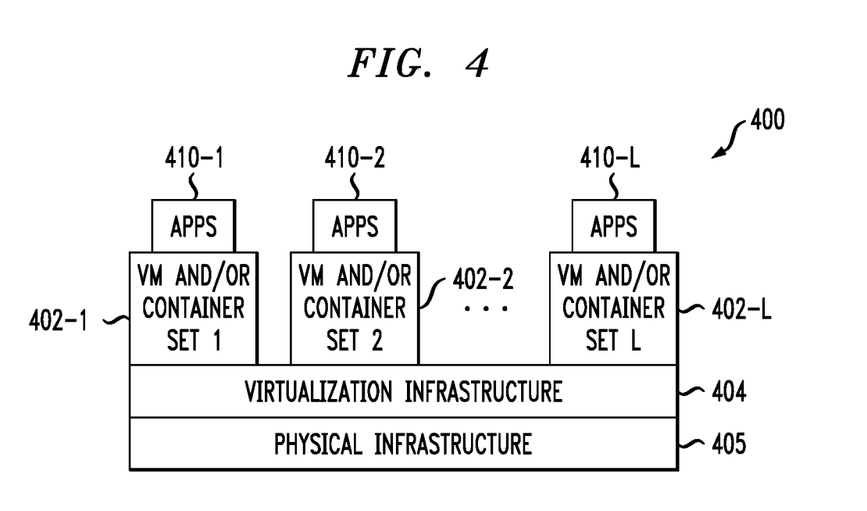
FIGS. 4 and 5 show examples of processing platforms that may be utilized to implement at least a portion of an information processing system in illustrative embodiments.
Figure 5:
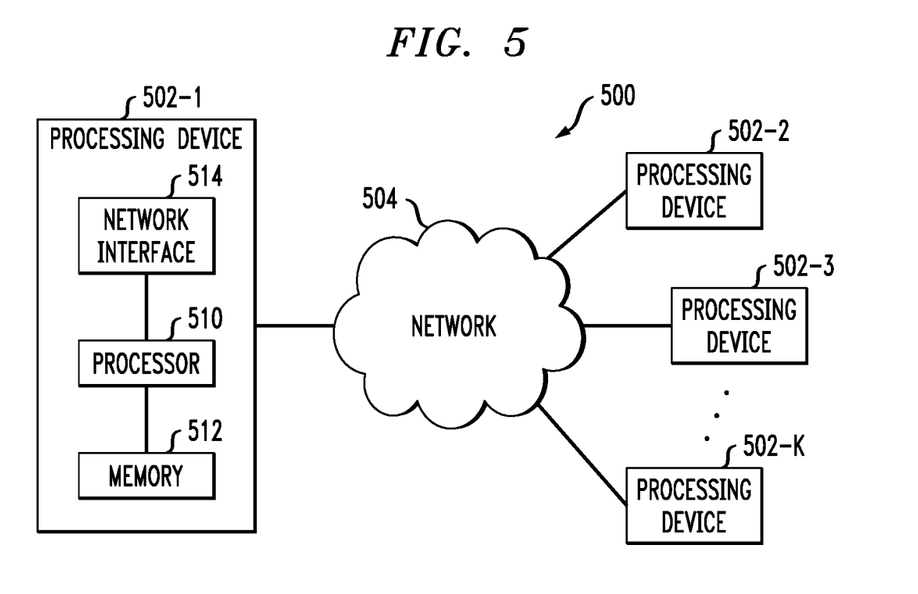

FIG. 4 shows an example processing platform comprising cloud infrastructure 400. The cloud infrastructure 400 comprises a combination of physical and virtual processing resources that are utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 comprise respective VMs, respective sets of one or more containers, or respective sets of one or more containers running in VMs. In some implementations of the FIG. 4 embodiment, the VMs/container sets 402 comprise respective VMs implemented using virtualization infrastructure 404 that comprises at least one hypervisor.

A hypervisor platform may be used to implement a hypervisor within the virtualization infrastructure 404, wherein the hypervisor platform has an associated virtual infrastructure management system. The underlying physical machines comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, ... 502-K, which communicate with one another over a network 504.

The network 504 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 502-1 in the processing platform 500 comprises a processor 510 coupled to a memory 512.

The processor 510 comprises a microprocessor, a microcontroller, an application-specific integrated circuit (ASIC), a field-programmable gate array (FPGA) or other type of processing circuitry, as well as portions or combinations of such circuitry elements.

The memory 512 comprises random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   obtaining usage-related data from one or more processing devices, wherein the usage-related data comprise time series data;
   determining at least one usage pattern for the one or more processing devices by processing at least a portion of the obtained usage-related data using one or more machine learning techniques, wherein processing the at least a portion of the obtained usage-related data using one or more machine learning techniques comprises predicting instances of one or more usage states by processing at least a portion of the time series data using at least one autoregressive integrated moving average model, and wherein the one or more usage states comprises at least an idle state;

automatically generating, based at least in part on the at least one determined usage pattern, instructions pertaining to controlling one or more power states of the one or more processing devices; and performing at least one automated action based at least in part on the generated instructions;

wherein the method is performed by at least one processing device comprising a processor coupled to a memory.

2. The computer-implemented method of claim 1, wherein determining the at least one usage pattern comprises determining at least one mode value attributable to at least one instance when the one or more processing devices are in the idle state.

3. The computer-implemented method of claim 1, wherein predicting the instances of one or more usage states comprises confirming the at least one determined usage pattern against one or more sets of historical usage-related data from the one or more processing devices.

4. The computer-implemented method of claim 1, wherein performing the at least one automated action comprises automatically transitioning at least a portion of the one or more processing devices to a decreased power mode at one or more instances of time in accordance with the generated instructions.

5. The computer-implemented method of claim 4, wherein automatically transitioning the at least a portion of the one or more processing devices to a decreased power mode comprises executing at least a portion of the generated instructions via at least one baseboard management controller associated with the one or more processing devices.

6. The computer-implemented method of claim 1, wherein obtaining the usage-related data comprises retrieving the usage-related data from at least one baseboard management controller associated with the one or more processing devices.

7. The computer-implemented method of claim 1, wherein determining the at least one usage pattern comprises determining at least one usage pattern in accordance with each of one or more temporal parameters.

8. The computer-implemented method of claim 1, wherein the usage-related data comprise baseline power values for the one or more processing devices.

9. The computer-implemented method of claim 1, wherein the usage-related data comprise information pertaining to one or more of central processing units, memory, system infrastructure utilization, and input-output activity.

10. The computer-implemented method of claim 1, processing the obtained usage-related data using one or more data cleaning techniques.

11. A non-transitory processor-readable storage medium having stored therein program code of one or more software programs, wherein the program code when executed by at least one processing device causes the at least one processing device:

to obtain usage-related data from one or more processing devices, wherein the usage-related data comprise time series data;

to determine at least one usage pattern for the one or more processing devices by processing at least a portion of the obtained usage-related data using one or more machine learning techniques, wherein processing the at least a portion of the obtained usage-related data using one or more machine learning techniques comprises predicting instances of one or more usage states by processing at least a portion of the time series data using at least one autoregressive integrated moving average model, and wherein the one or more usage states comprises at least an idle state;

to automatically generate, based at least in part on the at least one determined usage pattern, instructions pertaining to controlling one or more power states of the one or more processing devices; and to perform at least one automated action based at least in part on the generated instructions.

12. The non-transitory processor-readable storage medium of claim 11, wherein determining the at least one usage pattern comprises determining at least one mode value attributable to at least one instance when the one or more processing devices are in the idle state.

13. The non-transitory processor-readable storage medium of claim 11, wherein predicting the instances of one or more usage states comprises confirming the at least one determined usage pattern against one or more sets of historical usage-related data from the one or more processing devices.

14. The non-transitory processor-readable storage medium of claim 11, wherein performing the at least one automated action comprises automatically transitioning at least a portion of the one or more processing devices to a decreased power mode at one or more instances of time in accordance with the generated instructions.

15. An apparatus comprising:

at least one processing device comprising a processor coupled to a memory;

the at least one processing device being configured:

to obtain usage-related data from one or more processing devices, wherein the usage-related data comprise time series data;

to determine at least one usage pattern for the one or more processing devices by processing at least a portion of the obtained usage-related data using one or more machine learning techniques, wherein processing the at least a portion of the obtained usage-related data using one or more machine learning techniques comprises predicting instances of one or more usage states by processing at least a portion of the time series data using at least one autoregressive integrated moving average model, and wherein the one or more usage states comprises at least an idle state;

to automatically generate, based at least in part on the at least one determined usage pattern, instructions pertaining to controlling one or more power states of the one or more processing devices; and to perform at least one automated action based at least in part on the generated instructions.

16. The apparatus of claim 15, wherein determining the at least one usage pattern comprises determining at least one mode value attributable to at least one instance when the one or more processing devices are in the idle state.

17. The apparatus of claim 15, wherein predicting the instances of one or more usage states comprises confirming the at least one determined usage pattern against one or more sets of historical usage-related data from the one or more processing devices.

18. The apparatus of claim 15, wherein performing the at least one automated action comprises automatically transitioning at least a portion of the one or more processing devices to a decreased power mode at one or more instances of time in accordance with the generated instructions.

19. The apparatus of claim 15, wherein determining the at least one usage pattern comprises determining at least one usage pattern in accordance with each of one or more temporal parameters.

20. The apparatus of claim 15, wherein the usage-related data comprise information pertaining to one or more of central processing units, memory, system infrastructure utilization, and input-output activity.

* * * * *

UNITED STATES PATENT AND TRADEMARK OFFICE
CERTIFICATE OF CORRECTION

| | | |
|---|---|---|
| PATENT NO. | : 11,256,316 B2 | Page 1 of 1 |
| APPLICATION NO. | : 16/802840 | |
| DATED | : February 22, 2022 | |
| INVENTOR(S) | : Tamilarasan Janakiraman et al. | |

It is certified that error appears in the above-identified patent and that said Letters Patent is hereby corrected as shown below:

In the Claims

In Claim 10, Column 11, Lines 54-56, replace "The computer-implemented method of claim 1, processing the obtained usage-related data using one or more data cleaning techniques." with -- The computer-implemented method of claim 1, further comprising: processing the obtained usage-related data using one or more data cleaning techniques. --

Signed and Sealed this
Twenty-fifth Day of July, 2023

Katherine Kelly Vidal
*Director of the United States Patent and Trademark Office*